United States Patent
Barber

(10) Patent No.: US 10,679,216 B2
(45) Date of Patent: Jun. 9, 2020

(54) ONLINE MACHINE DATA COLLECTION AND ARCHIVING PROCESS

(71) Applicant: Kount Inc., Boise, ID (US)

(72) Inventor: Timothy P. Barber, Boise, ID (US)

(73) Assignee: Kount Inc., Boise, ID (US)

( * ) Notice: Subject to any disclaimer, the term of this patent is extended or adjusted under 35 U.S.C. 154(b) by 0 days.

(21) Appl. No.: 16/015,710

(22) Filed: Jun. 22, 2018

(65) Prior Publication Data

US 2018/0300719 A1   Oct. 18, 2018

Related U.S. Application Data

(63) Continuation of application No. 14/664,200, filed on Mar. 20, 2015, now Pat. No. 10,037,529, which is a (Continued)

(51) Int. Cl.
*G06Q 20/40* (2012.01)
*G06Q 10/00* (2012.01)
(Continued)

(52) U.S. Cl.
CPC ............ *G06Q 20/40* (2013.01); *G06Q 10/00* (2013.01); *G06Q 20/0855* (2013.01);
(Continued)

(58) Field of Classification Search
CPC .... G06Q 20/40; G06Q 20/0855; G06Q 20/10; G06Q 20/12; G06Q 20/3674;
(Continued)

(56) References Cited

U.S. PATENT DOCUMENTS 5,175,682 A   12/1992   Higashiyama et al.
5,444,616 A   8/1995   Nair et al.
(Continued)

FOREIGN PATENT DOCUMENTS

CA   2381025   2/2001
WO   WO 2001/037180   5/2001

OTHER PUBLICATIONS

Accelerated Examination Support Document, U.S. Appl. No. 12/607,335, Oct. 28, 2009, Eighty-two pages.
(Continued)

*Primary Examiner* — Kristie D Shingles
(74) *Attorney, Agent, or Firm* — Fenwick & West LLP

(57) ABSTRACT

An online machine data collection and archiving process generates a machine data profile of a customer computer accessing a transaction form of a merchant web site and links the machine data profile and a transaction record with customer identifying information using a unique transaction identification string. The process preferably captures parameters typically communicated as a part of web accesses, such as an IP address, an HTTP header, and cookie information. The process additionally causes the customer computer to process self-identification routines by processing coding within the merchant transaction form, the self-identification routines yielding further profile parameters. The process further includes a routine for bypassing an intervening proxy to the merchant web site to reveal the true IP address of the customer computer.

16 Claims, 5 Drawing Sheets

Related U.S. Application Data continuation of application No. 12/030,057, filed on Feb. 12, 2008, now abandoned, which is a continuation of application No. 09/873,339, filed on Jun. 5, 2001, now Pat. No. 7,330,871.

(60) Provisional application No. 60/209,936, filed on Jun. 7, 2000.

(51) Int. Cl.

| | |
|---|---|
| *G06Q 20/08* | (2012.01) |
| *G06Q 20/10* | (2012.01) |
| *G06Q 20/12* | (2012.01) |
| *G06Q 20/36* | (2012.01) |
| *G06Q 20/38* | (2012.01) |
| *G06Q 30/02* | (2012.01) |
| *G06Q 30/06* | (2012.01) |
| *G06Q 40/00* | (2012.01) |
| *H04L 29/08* | (2006.01) |

(52) U.S. Cl.
CPC ............ *G06Q 20/10* (2013.01); *G06Q 20/12* (2013.01); *G06Q 20/3674* (2013.01); *G06Q 20/382* (2013.01); *G06Q 20/385* (2013.01); *G06Q 20/401* (2013.01); *G06Q 30/0251* (2013.01); *G06Q 30/0255* (2013.01); *G06Q 30/0269* (2013.01); *G06Q 30/0601* (2013.01); *G06Q 30/0609* (2013.01); *G06Q 40/12* (2013.12); *H04L 67/303* (2013.01); *G06Q 30/02* (2013.01)

(58) Field of Classification Search
CPC .. G06Q 20/382; G06Q 20/385; G06Q 20/401; G06Q 40/12; G06Q 10/00; G06Q 30/0251; G06Q 30/0255; G06Q 30/0269; G06Q 30/0601; G06Q 30/0609; G06Q 30/02; H04L 67/303
USPC .......................................................... 709/201
See application file for complete search history.

(56) References Cited

U.S. PATENT DOCUMENTS

| | | | |
|---|---|---|---|
| 5,563,946 A | 10/1996 | Cooper et al. | |
| 5,679,940 A | 10/1997 | Templeton et al. | |
| 5,703,950 A | 12/1997 | Jovanovich et al. | |
| 5,845,267 A | 12/1998 | Ronen | |
| 5,848,412 A | 12/1998 | Rowland et al. | |
| 5,872,844 A * | 2/1999 | Yacobi ................... | G06Q 20/06 705/39 |
| 5,899,980 A | 5/1999 | Wilf et al. | |
| 5,903,721 A | 5/1999 | Sixtus | |
| 5,930,777 A | 7/1999 | Barber | |
| 5,991,758 A | 11/1999 | Ellard | |
| 6,000,832 A | 12/1999 | Franklin et al. | |
| 6,097,834 A | 8/2000 | Krouse et al. | |
| 6,117,011 A | 9/2000 | Lvov | |
| 6,134,597 A | 10/2000 | Rieth et al. | |
| 6,254,000 B1 * | 7/2001 | Degen ................... | G06Q 20/347 235/379 |
| 6,418,472 B1 * | 7/2002 | Mi ....................... | G06F 21/6218 709/202 |
| 6,496,936 B1 * | 12/2002 | French .................. | G06F 21/31 340/5.81 |
| 6,523,067 B2 | 2/2003 | Mi et al. | |
| 6,535,916 B1 | 3/2003 | Nguyen | |
| 6,697,948 B1 | 2/2004 | Rabin et al. | |
| 6,853,987 B1 | 2/2005 | Cook | |
| 7,263,506 B2 * | 8/2007 | Lee ........................ | G06Q 20/04 705/318 |
| 7,359,869 B1 | 4/2008 | Ananda | |
| 7,366,702 B2 | 4/2008 | David | |
| 7,555,460 B1 * | 6/2009 | Barkan ................. | G06Q 20/06 235/492 |
| 7,885,899 B1 | 2/2011 | Sancho | |
| 8,150,968 B2 | 4/2012 | Barber | |
| 2002/0013765 A1 | 1/2002 | Shwartz | |
| 2002/0073046 A1 | 6/2002 | David | |
| 2002/0087467 A1 | 7/2002 | Mascavage et al. | |
| 2002/0091646 A1 | 7/2002 | Lake et al. | |
| 2003/0208684 A1 | 11/2003 | Camacho et al. | |
| 2004/0254848 A1 | 12/2004 | Golan et al. | |
| 2006/0168663 A1 | 7/2006 | Viljoen et al. | |
| 2007/0027803 A1 | 2/2007 | Brandes et al. | |

OTHER PUBLICATIONS

Canadian Intellectual Property Office, Office Action, Canadian Patent Application No. 2,411,034, dated May 5, 2015, two pages.
Canadian Intellectual Property Office Notification, Canadian Patent Application No. 2,411,034, Feb. 25, 2010, 3 pages.
Chan, P. et al., "Distributed Data Minin in Credit Card Fraud Detection," IEEE Intelligent Systems, Nov./Dec. 1999, pp. 67-74.
European Patent Office, Summons to attend oral proceedings pursuant to Rule 115(1) EPC, European Patent Application No. 01941903.5, Aug. 3, 2015, eight pages.
European Patent Office Communication and Supplementary European Search Report, European Patent Application No. EP 01941903, dated Jun. 16, 2010, 2 pages.
Office Action for Canadian Patent Application No. CA 2,960,857, dated Nov. 20, 2017, 3 Pages.
Canadian Intellectual Property Office, Office Action, Canadian Patent Application No. 2,960,857, dated Jul. 30, 2018, four pages.
United States Office Action, U.S. Appl. No. 14/664,200, dated Sep. 8, 2017, 10 pages.
United States Office Action, U.S. Appl. No. 14/664,200, dated Jun. 1, 2017, 14 pages.
United States Office Action, U.S. Appl. No. 12/030,057, dated Feb. 4, 2011, 12 pages.
United States Office Action, U.S. Appl. No. 12/030,057, dated Sep. 15, 2010, 11 pages.
United States Advisory Action, U.S. Appl. No. 09/873,339, dated Sep. 26, 2006, three pages.
United States Office Action, U.S. Appl. No. 09/873,339, dated Jul. 25, 2007, five pages.
United States Office Action, U.S. Appl. No. 09/873,339, dated Jun. 26, 2006, ten pages.
United States Office Action, U.S. Appl. No. 09/873,339, dated Dec. 13, 2005, 11 pages.
United States Office Action, U.S. Appl. No. 09/873,339, dated Jun. 15, 2005, 15 pages.
United States Office Action, U.S. Appl. No. 09/873,339, dated Dec. 22, 2004, 13 pages.

\* cited by examiner

ONLINE MACHINE DATA COLLECTION AND ARCHIVING PROCESS

CROSS REFERENCE TO RELATED APPLICATIONS

This is a continuation of U.S. patent application Ser. No. 14/664,200 filed on Mar. 20, 2015, which is a continuation of U.S. patent application Ser. No. 12/030,057 filed on Feb. 12, 2008, which is a continuation of U.S. patent application Ser. No. 09/873,339 filed on Jun. 5, 2001, now U.S. Pat. No. 7,330,871, which claims the benefit of priority to U.S. Provisional Application No. 60/209,936, filed Jun. 7, 2000, all of which are incorporated by reference in their entirety.

BACKGROUND OF THE INVENTION

The present invention relates to identity detection techniques and, more particularly, to a process for collecting and utilizing machine-identifying data of computers and other online appliances used in online interactions and transactions and associating the collected machine data with such online interactions.

The internet, or global computer network, represents a new medium for marketing similar to the way mail ordering and telephone ordering did in the past. A downside of internet marketing is that it also presents new opportunities for unscrupulous persons to take advantage of the mechanisms of internet transactions by fraudulent and deceptive practices. Merchants and financial institutions bear the initial costs of fraud. However, consumers ultimately pay the costs in the form of prices and credit rates which must take into account losses from fraud. Internet purchases typically involve the use of web page forms which are filled in by the customer with identity, address, purchase, shipping, and payment information and submitted to the online merchant for processing. Internet purchases are most often paid for by way of credit cards. While a merchant's software may be able to verify the existence and status of a credit card account number and an authorization for a specific amount, the merchant is often not able to match a credit card number with a specific purchaser or shipping address. Thus, absent any overt indication otherwise, a merchant generally assumes that anyone using a credit card is authorized to do so and that a customer is who he identifies himself to be.

An important step in combating fraud is accurate identification of the computers through which customers make transactions and associating such identities with transactions which arouse suspicions or which ultimately turn out to be fraudulent. Basic machine identity is essential to the manner in which the internet operates. We speak in terms of "going" to a web site. In reality, "going" to a web site involves sending a request for a web page file in a directory or folder on a computer located at a specific internet protocol, or IP, address. In order for the web page file to be returned to the requesting computer for processing into a displayed "web page", the request must include return "directions" in the form of the basic identity of the requesting computer, including its IP address. Some web sites are implemented with software which enables responses to web page requests to be tailored to specifics of the requesting machine's configuration, specific web browser, and the like. For this reason, current versions of browsers usually communicate configuration information in addition to a return IP address and return path.

The IP address of a page requesting computer can give an indication of the specific country where the computer is located. Further, identification of a page-requesting computer can also recognize a returning user using the same computer as during a previous access. For example, placing an HTTP (hypertext transfer protocol) "cookie" on a page-requesting computer can make it possible to identify the computer on a later access.

Because direct interaction with a customer's computer is essential in detecting fraud, it has been assumed that any viable fraud detection software must be integrated with a merchant's software. As a result, most existing fraud detection solutions require merchants to either abandon or extensively modify their existing web-based transaction processing software. An additional problem with focusing fraud detection at single merchants is that perpetrators of fraud often hit many merchants in an attempt to avoid or delay detection. Thus, an ideal system for fraud detection in online marketing would only minimally affect the merchant's existing software and would route fraud detection efforts through a central, third-party entity serving a large multitude of merchants.

SUMMARY OF THE INVENTION

The present invention provides a process for collecting data associated with a customer's computer during access of a merchant, financial, other host web site, and associating a transaction identification number with the data and with a transaction form of the merchant. Generally, the present invention captures machine identifying data from a computer or other digital appliance accessing a host web site, sends the captured data to a machine data archive along with a unique transaction identification string for storage in the archive and writes the same transaction identification string into a transaction form through which transactions with the host web site are conducted. The machine data is, thus, associated with the customer identification data within the transaction form by way of the transaction identification string and can be used on-the-fly or at a later time for a variety of purposes including, but not limited to, fraud detection. Although the term "archive" is used, the machine data collected need not be stored permanently.

The machine data collection process of the present invention is intended to be employed in a variety of applications including, but not limited to: online purchases and orders; online banking, bill payment, and funds transfers; online registrations, such as for memberships, product warranties, applications for credit, renewal of subscriptions and licenses; online technical support; and the like. The term "transaction" is used in the present invention to describe an interaction effected between a digital appliance and a host system. However, the term "transaction" is not intended to be restricted to only commercial interactions involving purchases. The term "transaction" is intended to apply to an interaction of a remote digital appliance with a host system using a relatively anonymous type of access process over a digital medium in which some form of self-identification of the accessing appliance is inherent in the access process and in which the true identity of the accessing party, the true source address of the appliance on the medium, and/or the true machine characteristics of the accessing appliance is/are essential or desirable to the interaction.

The host entity which operates the host system accessed is intended to encompass a commercial, financial, educational, governmental, associational, or other type of entity. The term "merchant" will be used herein to refer to such a host entity without intent to limit the present invention to commercial transactions. The medium of access is intended to be interpreted as including a global computer network such as the internet or world wide web, as well as other types of networks which may be less than global but which are publicly and/or anonymously accessible. The term "internet" will be used herein to refer to the medium through which accesses to the host entity are made. The terms "customer computer" or "machine" are used herein to refer to a device for effecting remote access to a host system over a digital medium and are meant to encompass not only conventional types of personal computers, but also additional types of "digital appliances" with online access capabilities, such as: cell phones, personal digital assistant devices, electronic game systems, television sets with online access capabilities, web appliances for vehicles, and any other type of device with online access capabilities whether connected to a wired communications network directly or by a radiant technology.

The machine data collection process of the present invention contemplates a two party process embodiment in which a "merchant" processes and/or stores machine data profiles of customer computers in-house, as well as a three party process embodiment in which machine data profiles of customer computers are processed and/or stored for the merchant by a third-party machine data collection and archive service.

In a two party embodiment of the data collection process of the present invention, the customer machine data is captured by a merchant or host system which also generates a unique transaction identification (ID) string and assigns or associates the transaction ID with a machine data profile of the customer machine data profile. In the two party process, the merchant system captures customer computer data which is inherently passed from the customer computer to the merchant's web site, such as an IP address of the customer computer and an HTTP header. Additionally, according to the present invention, the merchant web page code may have routines or calls for external routines which, when processed by the customer computer, cause the customer computer to further identify itself by collecting and returning certain machine and software configuration characteristics, which can be used to identify the particular customer computer. The two party process may include the generation and setting of an HTTP cookie in the customer browser for recognition upon a later access with the merchant web site.

Although the two-party embodiment of the machine data collection process of the present invention has utility for some applications, the three party embodiment is preferred for applications in which analysis of a maximum number of customer computer profiles is desirable, such as certain types of marketing processes and fraud detection and control processes. In a three embodiment of the present invention, the customer machine data of computers accessing the second party or merchant web site is communicated to and stored within a third party system, referred to herein as a machine data archive service. In the three party process, the transaction ID could be generated by the merchant system, but is preferably generated by the archive service. The use of the term "archive" is not meant to indicate that the customer machine data profiles are stored permanently within the third party system. Permanent storage of such profiles may not be practical, as far as yielding beneficial results to the purposes for which the profiles are collected. Thus, the term "archive" is meant to indicate a central storage facility, such as a database, with a selected retention period, with purging of most profiles after a certain length of time.

In the three party process a routine or line of code is added into the hypertext markup language (HTML) code which defines the merchant's web page, particularly an order or transaction form page. The added routine issues a request for a machine data collection (MDC) script to the third-party web site when the form page code is processed by the customer's browser. When the script request is received by the machine data archiving service (MDAS), the archive service generates a unique transaction identification (TA/ID) and checks for its own cookie. If no MDAS cookie is present, the archive service sends a cookie to the requesting computer along with a machine data collection (MDC) script having the transaction ID embedded therein. The MDC script is executed by the customer's browser, causing collection of certain data from the customer's computer which is sent back to the archive service along with the transaction ID and stored in a machine data profile in the machine data archive. The transaction ID is written into the transaction form, and when the transaction form is submitted to the merchant web site, the transaction ID string becomes a part of the transaction data record, along with customer identification, location, and financial information.

The machine data initially collected and stored in each profile preferably includes the transaction ID, the apparent IP address of the customer's computer, a conventional HTTP header which identifies the customer's browser versions and certain configuration aspects of the browser, and the archive service's cookie. The combination of such information, minus the transaction ID, will be relatively rare but may not be unique. Additionally, customers intent on conducting fraudulent transactions often hide their IP address behind HTTP proxies. In order to further narrow the machine profile, in a preferred embodiment of the present invention, the MDC script performs additional machine profiling operations: generation of a machine "fingerprint" and a proxy "piercing" operation.

In the fingerprint generation operation, the MDC script assembles an attribute string formed by various attributes or configuration settings of the browser which can be queried by the script. The MDC script then performs a conversion process on the attribute string to generate a fingerprint string having content which is a function of the original content of the attribute string. The conversion process is preferably a "hashing" function which is, in effect, an irreversible encryption algorithm. The generation of a conventional checksum is one example of a type of hashing function. For example, if the attribute string is formed by alphanumeric characters, the conversion process is performed on the string of codes representing the characters. The particular conversion process or hashing function used may be one of many types of conventional conversion algorithms or hashing functions, which are typically used for data integrity tests. The resulting string from the MDC conversion process is a so-called fingerprint, which is returned to the archive service along with the transaction ID for storage in the machine profile. A time value, queried from the customer computer time-of-day clock, is returned with the fingerprint string and stored in conjunction therewith.

An HTTP proxy is one of several types of proxies through which a browser may be setup to operate. Setting up an HTTP proxy causes HTTP requests to be relayed by a primary gateway, through which the computer actually interfaces to the internet, to a remote secondary gateway, or proxy, with an IP address different from the primary gateway IP address. Such redirection hides the true IP address of a computer. The proxy piercing operation of the MDC script queries the customer computer for any LAN (local area network) address which may be assigned to the computer and reads the system time of day clock. Then attempts are made to send the LAN address, if any, the time value, and the transaction ID to the archive service using a protocol which will not be redirected through the HTTP proxy, for example a lower level protocol such as TCP/IP or UDP protocols. If the attempt is successful, the message containing the time value, the transaction ID, and LAN address arrive at the archive service web site with the true return IP address of the customer computer, whether an HTTP proxy intervenes or not. The LAN address and IP address so derived are stored in the machine profile. It should be noted that the use of an HTTP proxy is not, of itself, an indication of fraud. However, the acquisition of an additional IP address is one more parameter with which to identify a particular computer.

When, and if, the customer submits the transaction form to the merchant, the transaction ID string is communicated to the merchant, along with other customer information such as name, address, credit card number and the like plus transaction information. The complete transaction record is stored on the merchant's system and is associated with a specific machine identity profile within the archive service by way of the transaction ID string. Thereafter, the stored machine identity profiles and transaction records of large numbers of transactions can be analyzed by various fraud detection techniques to detect patterns of fraud and fraud attempts and, preferably, identify and locate the sources of such activity.

The machine data profiles stored in the archive service need not be combined with the customer identification information for non-suspicious transactions, to thereby preserve the privacy of non-suspicious customers within the machine data archive. However, the processes of the present invention do not require that the customer identification information be kept separated from any associated machine data profiles, and there may be reasons to combine the associated records.

Figure 1:
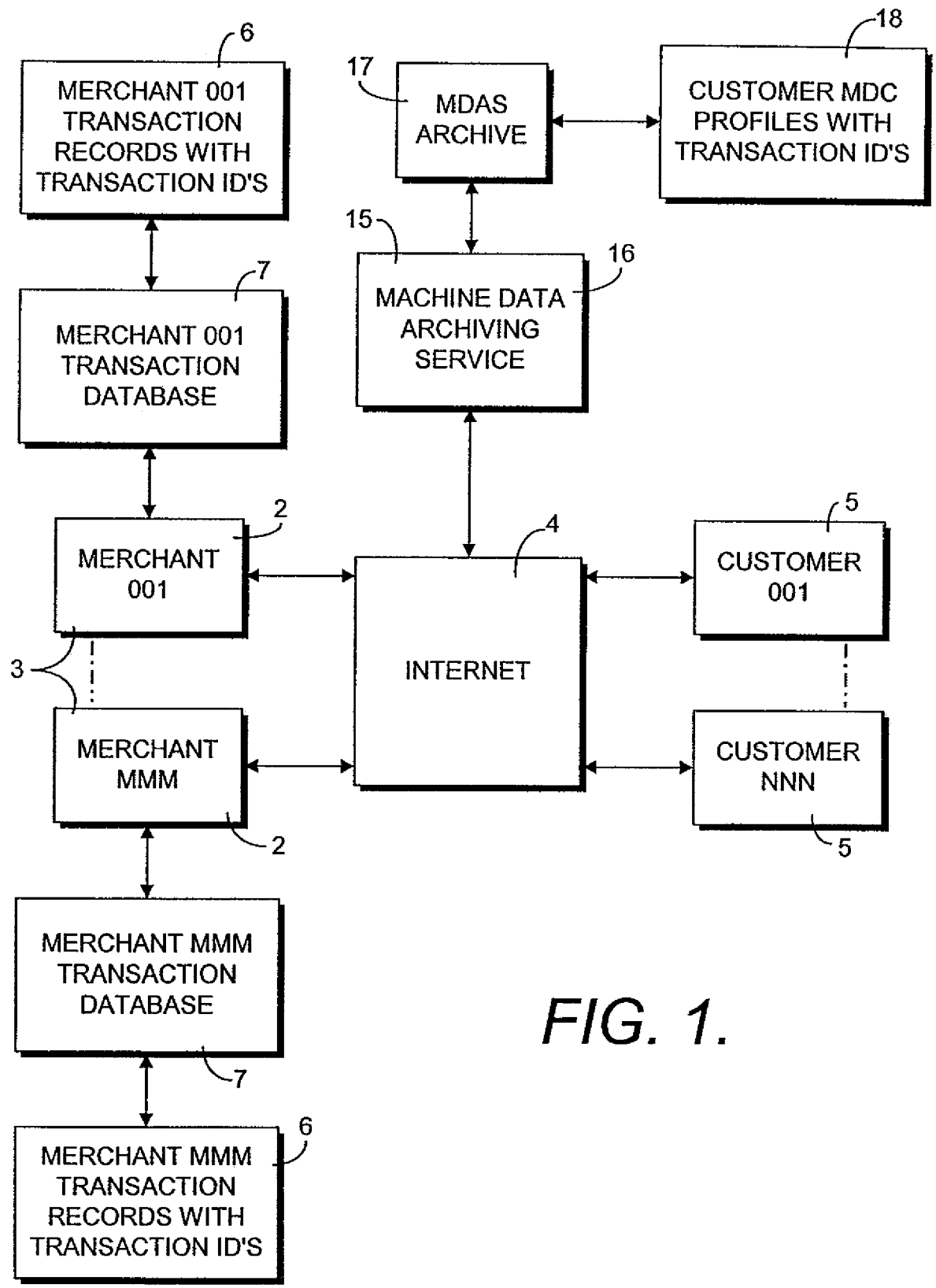
FIG. 1 is a simplified block diagram illustrating a plurality of customer and merchant computers interfaced to the internet along with a machine data archiving service computer for practicing the machine data collection process of the present invention.

Various objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 (FIG. 3) generally designates a process for online collection of machine identifying or profiling data of computers involved in commercial transactions and for archiving such data to facilitate analysis for fraud detection purposes. The process collects machine identifying or profiling data of computers involved in commercial transactions and archives such data in a third-party machine data archive service in association with a transaction identification string or ID which is also written into a transaction form of a merchant with whom the customer is conducting a transaction.

FIG. 1 illustrates a plurality of host entities or merchants with corresponding merchant computers 2, on which are operated merchant web sites 3 which are accessible over a global computer network, such as the internet 4, by a plurality of customer computers 5. The merchant computers 2 execute various programs which enable the sale of products or services by way of the internet 4. The merchant web sites 3 typically make use of form type web pages with which the customers 5 interact by filling in various data fields, for example, name, address, shipping address, telephone number, credit card type and number and expiration date, and description and quantities of products to be ordered.

The merchant transaction forms are usually written in hypertext markup language (HTML) and may include requests for code written in other languages, such as Java and the like. When a customer 5 accesses a merchant's transaction form, a transaction form file is communicated to the customer's computer with various data fields displayed as fill-in boxes or the like. The customer fills in the appropriate fields and selects a submit "button" which activates a routine to transfer the collected information back to the merchant web site 3 for processing. The returned "form" is a data record 6 which is stored in a merchant transaction database 7 for retrieval and processing in due course to cause the ordered items to be gathered, packaged and prepared for shipment, along with financial processing to debit the customer's credit account. The financial processing may include a validity check of the credit account and an authorization check for the amount of purchase with the credit card issuer. Additionally, inventory management processes are executed based on the items withdrawn from stock for shipment.

In a three party embodiment of the present invention, the process 1 makes use of an entity referred to herein as a machine data archiving service, MDAS or archive service, which operates an archive service computer system 15, including an archive service web site 16. The archive service system 15 maintains a machine data archive service database or archive 17 in which the machine data collection profiles 18 from customer computers 5 of the merchants 2 are stored. The archive service web site 16 is interfaced to the internet 4. The archive service 15 is preferably independent of the merchants and may be operated by a merchants' association, a financial institution or association thereof, or may be an independent contractor. Alternatively, it is conceivable that a merchant with a high volume of online sales could operate its own in-house machine data profile collection and archiving service 15, for fraud detection or possibly for marketing purposes.

Figure 2:
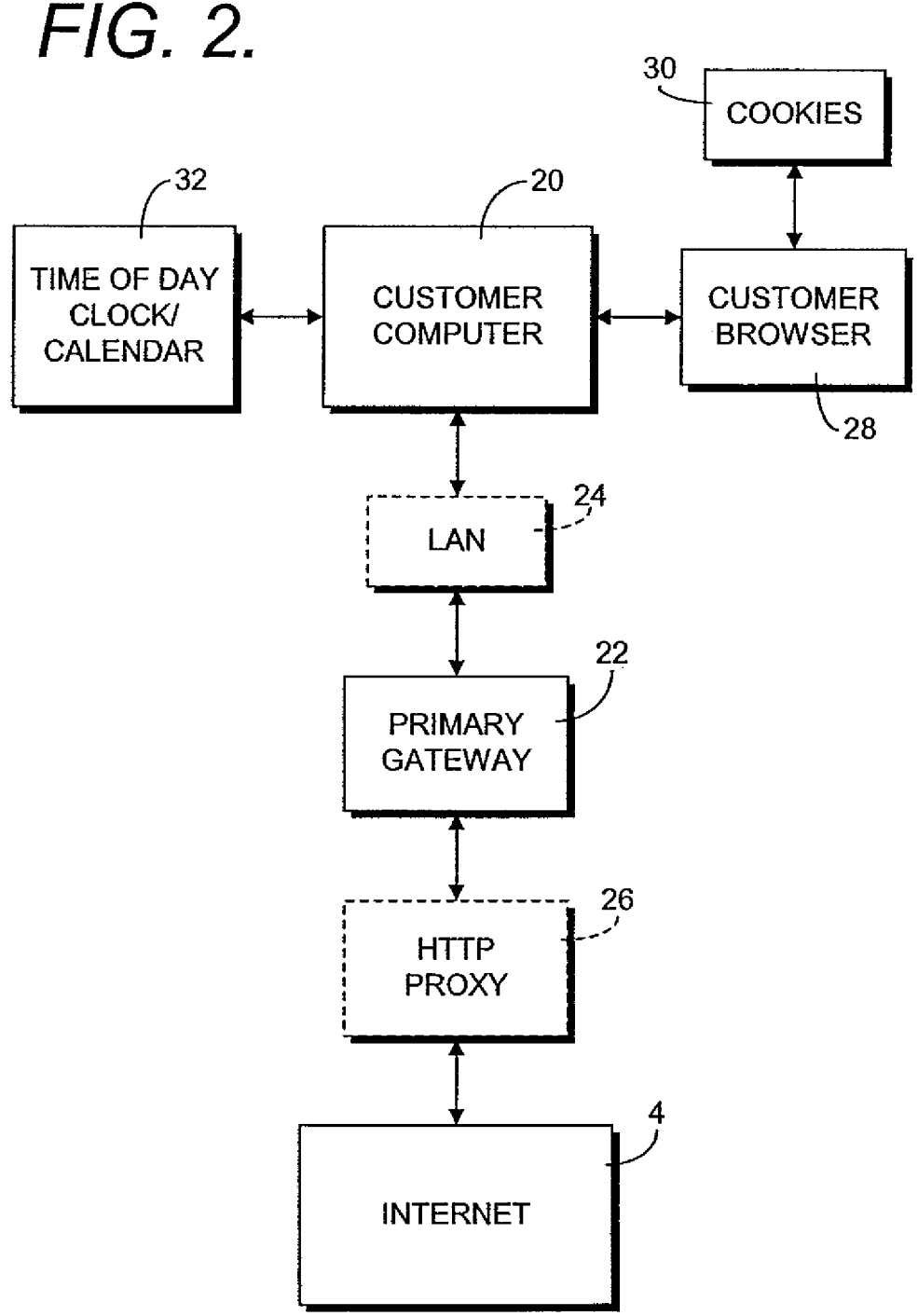
FIG. 2 is a simplified block diagram illustrating connection of a customer computer to the internet, with optional components shown in phantom lines.

Referring to FIG. 2, a customer computer system 5 includes a customer computer 20 interfaced to the internet 4 by way of a primary gateway 22, as of an internet service provider (ISP). The computer 20 might be one of many on a local area network or LAN 24 which includes a router or switch which routes data from the internet 4 to the computers on the network. The computer 20 may communicate through the internet 4 by way of a HTTP (hypertext transfer protocol) proxy 26, which disguises the internet protocol (IP) address of the actual gateway 22. The computer 20 accesses web sites on the internet 4 using a customer web browser 28 which processes HTML language and various other standard web oriented languages to display or otherwise render the content of web pages and interact therewith. The browser 28 is normally enabled to accept "cookies" 30 which are stored in a cookie file. Cookies 30 are data strings which are issued by web sites and give an indication of a previous visit to a particular web site and may indicate a particular configuration or set of preferences of the customer's setup of the computer 20. Typically, the customer computer 20 has a time of day clock/calendar 32.

The customer computer 20 may have a fixed IP address, depending on the manner in which it is interfaced to the internet. More commonly, the customer computer 20 will have a temporary or dynamically assigned IP address which is determined by the primary router 22. The primary router 22 has an IP address, as do a router of a LAN 24 or an HTTP proxy 26 if either is present in the customer's computer system 5.

Figure 3:
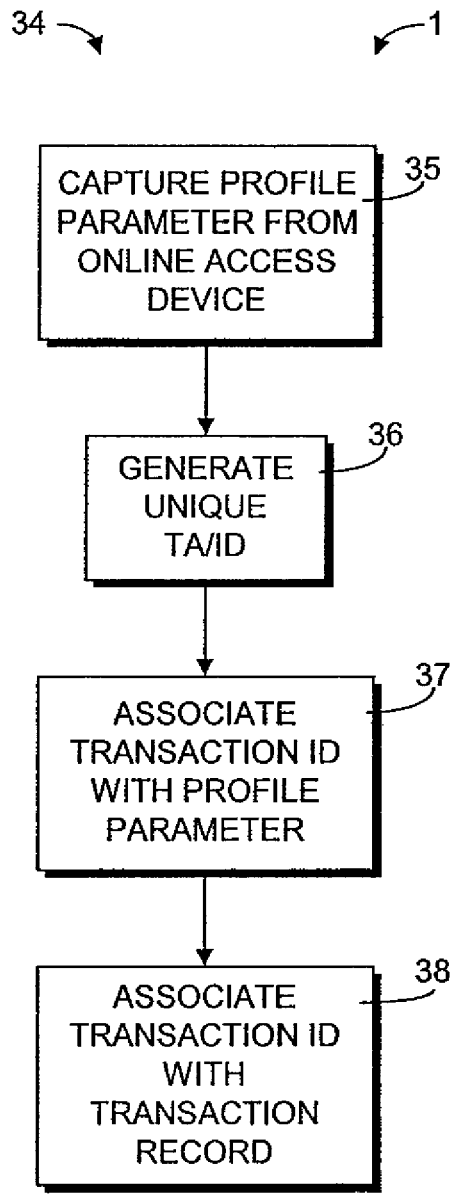
FIG. 3 is a flow diagram illustrating principal steps of the machine data collection and archiving process according to the present invention.

FIG. 3 illustrates the principal actions or steps of a general or basic process 34 of the process 1 for collecting machine identifying data from customer computers 5. At step 35, at least one machine identifying profile parameter is captured upon access of a customer computer 5 or other online access device with a host or merchant web site 3. A unique transaction identifier or TA/ID is generated at 36 and associated at 37 with the captured profile parameter. The transaction ID is also associated at step 38 with a transaction record generated as a result of the interaction or transaction conducted between the customer computer 5 and a merchant web site 3. Although not specifically shown in FIG. 3, the process 34 may capture machine profile data that is passed from the customer computer 5 to the merchant computer 3 as an inherent step of the customer computer 5 accessing the merchant computer 3. Alternatively, the process 34 may pass routines to the customer computer 5 to cause it to "self-identify" itself by querying certain configuration parameters and passing such information to a machine profile stored either within the merchant's system 2 or in a third party archive 17. The process 34, thus, encompasses a two-party embodiment or a three party embodiment of the machine data collection and archiving process 1 of the present invention.

Figure 4:
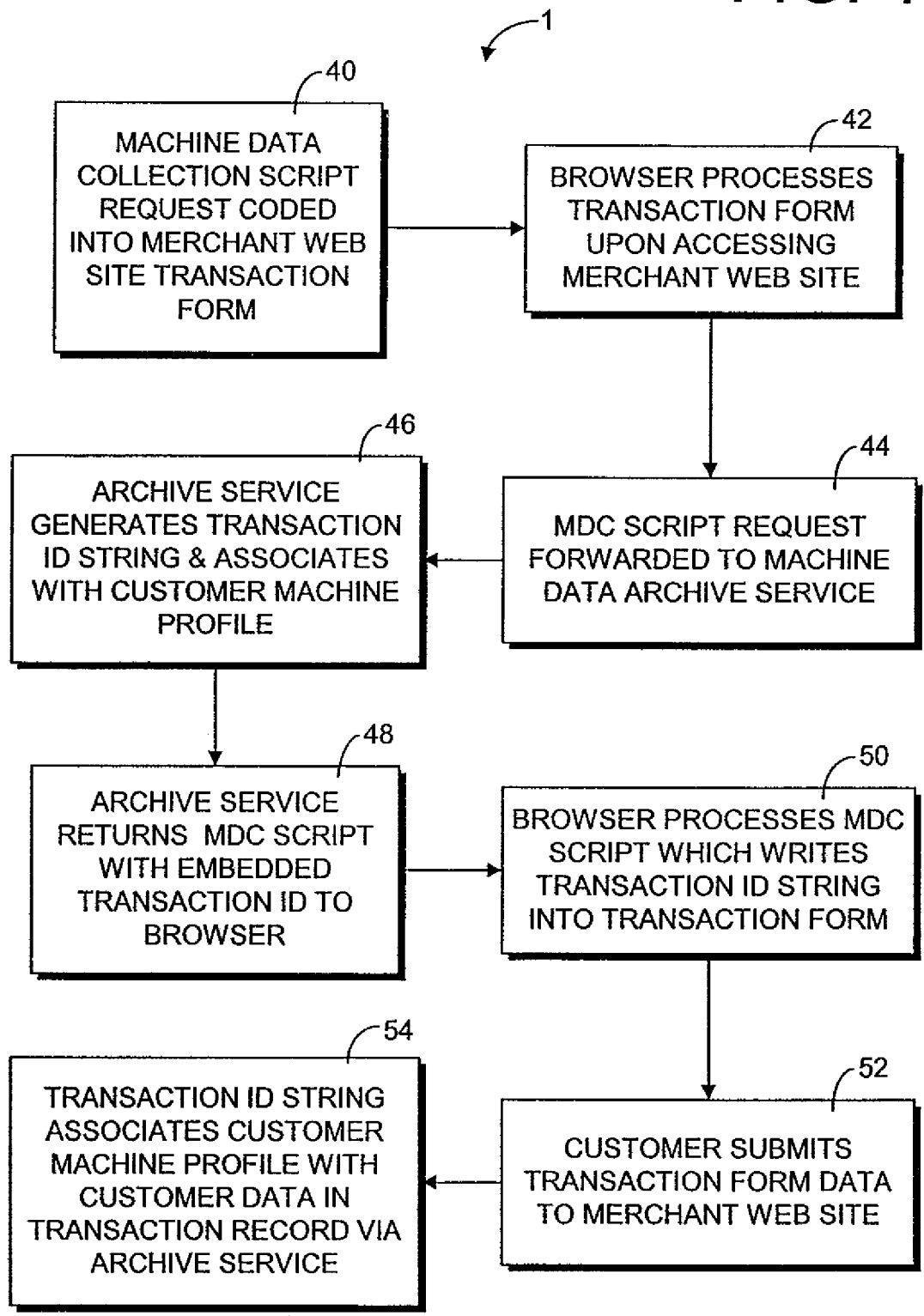
FIG. 4 is a flow diagram illustrating more detailed steps of the machine data collection and archiving process according to the present invention.

Referring particularly to FIG. 4, a more particular three party embodiment of the machine data collection and archiving process 1 begins at step 40 with the coding of a machine data collection (MDC) script request into the web page code for a transaction form of a merchant web site 3. When a customer 5 accesses the merchant transaction form at step 42, the customer browser 28 processes the transaction page code, including the MDC script request, which causes the MDC script request to be communicated to the archive service web site 16 at step 44. The script request arrives at the archive service 15 with a set of customer machine parameters which principally provide a return path for the MDC script from the archive service 15 to the customer 5. The customer machine parameter set preferably includes "user agent" information, which is the version of the customer browser 28.

At step 46, the archive service 15 generates a unique transaction ID string and associates it with the customer machine parameter set in the MDAS archive 17. At step 48, the archive service returns the MDC script, with the transaction ID embedded within it, to the customer browser 28. At step 50, the customer browser 28 processes the MDC script which, at a minimum, writes the transaction ID string into the merchant's transaction form. Assuming that the customer 5 completes the transaction and submits the transaction form to the merchant 2 at step 52, the transaction ID string is stored with the transaction data record 6 in the merchant transaction database 7. The transaction ID, thus, indirectly associates the machine data parameter set 18 stored in the MDAS archive 17 at step 54 with the customer identity information stored with the transaction data record 6 in the merchant's transaction database 7. Thereafter, qualified parties may access the MDAS archive 17 for information related to a transaction ID.

The MDAS archive 17 need not contain any information which specifically identifies a particular customer, only the machine parameter profiles 18 with associated transaction ID strings. The MDAS archive records 18 can be analyzed in conjunction with the merchant transaction records for patterns of fraud or for other purposes. The great majority of MDAS archive records can be purged from the archive 17 after a selected period of time. Any records which are associated with any transaction irregularities or suspicions of actual fraud may be retained longer.

Figure 5:
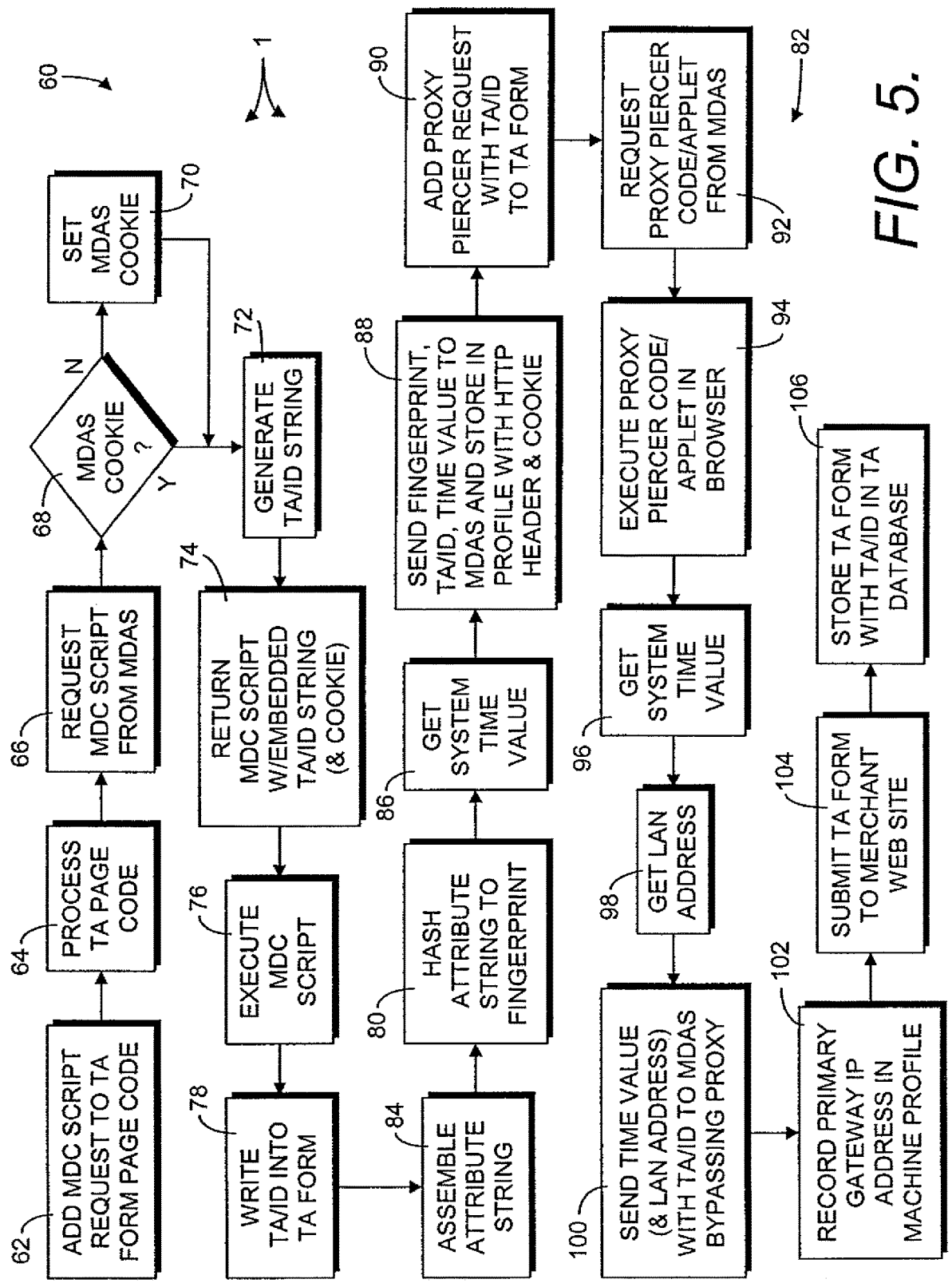
FIG. 5 is a flow diagram illustrating a still further detailed steps in the machine data collection and archiving process of the present invention.

FIG. 5 illustrates the principal steps of a preferred embodiment 60 of the machine data collection and archiving process 1 of the present invention. The process 60 begins with the addition at 62 of a machine data collection (MC) script to the transaction (TA) form page code of a merchant web site 3. The transaction form page code is processed at 64 by a customer browser 28 when the merchant web page is accessed to thereby request the MDC script at 66 from the Machine data archive service (MDAS) web site 16. When the browser 28 accesses the MDAS web site 16, requesting the MDC script, the MDAS web site checks for the presence of an MDAS cookie at step 68. If no MDAS cookie is detected, an MDAS cookie is generated at 70 and a unique transaction identification (TA/ID) string is generated at 72. The MDC script, transaction ID, and cookie, if not previously set, are returned at 74 to the customer browser 28, the transaction ID being embedded within the MDC script.

When the MDC script is received by the browser 28, it is executed at 76. The cookie is stored in the cookie file 30, or possibly in the memory of the customer computer 20. Execution of a preferred MDC script causes several actions to be performed. The MDC script writes the transaction ID into the transaction form at step 78. The script can do this by either setting an existing variable of an appropriate name to the transaction ID string or by writing an appropriate variable into the transaction form page and setting its value to the transaction ID string. Additionally, the preferred MDC script generates a "fingerprint" of the customer computer 20 at step 80 and attempts to perform a proxy piercing operation at step 82.

In generating the machine fingerprint at 80, the MDC script queries the browser 28 for a number of attributes and settings and concatenates the results into an attribute string at 84. The MDC script then performs a hashing algorithm on the attribute string at 80 to generate a fingerprint string which has a high degree of uniqueness. Hashing functions are irreversible encryption processes in which the result is dependent on the original content of the data on which the hashing algorithm is operated. Hashing functions are commonly used for data integrity checking. As previously stated, a common checksum is the result of a type of hashing function. The particular hashing function employed preferably maximizes the uniqueness of the resulting fingerprint.

At step 86, the customer computer clock 32 is queried for a current time value. At step 88, the fingerprint, the transaction ID, and the time value are communicated to the MDAS web site 16 along with an HTTP header with cookie and "apparent" IP address, all of which are stored as a machine data profile 18 within the MDAS archive 17.

At step 90, the MDC script adds a proxy piercer request to the transaction form which, when executed by the browser 28 at step 92, sends a request for a proxy piercer applet or code to the MDAS web site 16. When the proxy piercer applet/code is executed by the browser 28 at 94, a time value from the clock 32 is again queried at 96 and any existing local area network (LAN) address is queried at 98. At step 100, the proxy piercer applet/code sends the time value, the LAN address (if any), and the transaction ID to the MDAS web site 16 by a protocol which bypasses any existing HTTP proxy 26. The protocol used is one which is at a lower level than HTTP, such as UDP (user datagram protocol) or, preferably, TCP/IP (transmission control protocol/internet protocol).

Bypassing the HTTP proxy 26 causes the data sent in step 100 to arrive at the MDAS web site 16 with the IP address of the primary gateway 22, which may be different from any apparent IP address previously recorded if an HTTP proxy 26 intervenes. If the proxy piercer procedure 82 is successful, the primary gateway IP address is stored at step 102 within the machine data profile 18 identified by the transaction ID. It should be noted that some types of proxies, such as some types of firewalls, may block all non-HTTP protocol packets, so that the proxy piercer procedure 82 might not be successful in all cases.

If the customer completes the transaction with the merchant web site 3, the transaction form is submitted at step 104, which causes the transaction record 6, including the transaction IID, to be stored at step 106 in the merchant database 7 for processing.

Following are examples of code for an MDC script, as from steps 40 or 62. Assuming the machine data archiving service or MDAS web site 16 has the fictional URL (uniform resource locator) example-url.net and a specific merchant has a merchant identifier MMM, a line of HTML code is added at step 40 to the transaction form of merchant MMM between the <form> and </form> HTML tags which has the form:

<script src=https://www.example-url.net/s/?MMM></script>-;

When the customer browser 28 processes the transaction form at step 42, it requests a script file from the source URL: https://www.example-url.net/s/?MMM.

At step 44, the customer web browser 28 requests the MDC script by way of the HTTP protocol. The HTTP request includes the merchant ID the user agent (browser version), the IP address of the customer's HTTP proxy, and any HTTP cookies previously sent to the customer by www.example-url.net. Upon receiving this information, the archive service 16 records this information in a machine data record which also includes the transaction ID.

Upon receiving the file request, the archive service 16 generates a unique transaction ID (represented below as ZZZ) at step 46 to be associated with the transaction and the machine parameter set. An exemplary transaction ID is a string of 24 letters and digits. The first eight digits form a time stamp which is a hexadecimal representation of the seconds elapsed since midnight Jan. 1, 1970 UTC (coordinated universal time).

In the preferred embodiment of the process 1, the MDC script is written in an ECMAScript compliant language, such as JavaScript, JScript, or VBScript. A JavaScript version of the MDC script is as follows (linebreaks and indentations added for clarity):

```
document.write("<input name=transactionid type=hidden value=ZZZ>;
d=new Date( );
t=3600*d.getHours( )+60*d.getMi- nutes( )+d.getSeconds( );
document.write("<img height=1 width=1 src=https://www.example-url.net/t/?i=ZZZ&t="+t+">");
document.write("<applet height=1 width=1
codebase=https://www.example-url.net/
code=a/?ZZZ>
<param name=i value=ZZZ></applet>");
```

The exemplary MDC script includes the unique transaction ID value in several places. When the script executes on the customer computer 20, it writes HTML code into the merchant's order form. Specifically:

1) The script adds a hidden variable called "transactionid" to the merchant's transaction form and assigns it the value of the transaction ID (ZZZ). When the transaction form is submitted, the merchant receives the transaction ID and can associate it with the transaction data record.

2) The script computes the seconds elapsed since midnight on the clock 32 and writes a request for a 1 pixel by 1 pixel image. Included in the request is the transaction ID and the time value. When the request executes, this data is sent back to the archive service 16 and recorded with the transaction ID in the MDAS archive 17.

3) The script adds a request for a program located at the archive service web site 16 which, in this example, is a Java applet. The applet downloads to the customer computer 20 from the archive service 16 and executes, appearing as a 1 pixel by 1 pixel image on the transaction form. The transaction ID is passed to the program as a parameter specified in the script. The program performs three tasks:

a) it calculates TTT, the seconds elapsed since midnight on the system clock 32;

b) it calculates AAA, the address of the customer 20 on its own local area network 24; and c) it sends this data back to the archive service 16 via TCP/IP, by requesting the following URL:

http://www.example-url.net/d/?i=ZZZ&t=TTT&a=AAA

The archive service 16 receives the message which includes the parameters TTT, AAA, and ZZZ. The message also includes the IP address of the sender. This address is the customer's actual IP address, which in some cases is different from the HTTP proxy IP address. The archive service 16 records this information in the MDAS archive 17 and associates it with the transaction ID ZZZ.

The machine data collection and archiving process 1 of the present invention has been described with a particular application in fraud detection. However, it is foreseen that the techniques of the present invention have a wider application, as for marketing or computer support purposes, or other functions. While the process 1 has been described with reference to the internet 4 or world wide web, it is also conceivable that the process 1 could be employed on computer networks of less than global expanse, such as a large intranet, a national or regional network, or the like.

Therefore, it is to be understood that while certain forms of the present invention have been illustrated and described herein, the present invention is not intended to be limited to the specific forms, arrangement of parts, sequence of steps, or particular applications described and shown.

What is claimed is:

1. A method for identifying a device involved in an online transaction, the method comprising:
   receiving a communication from the device in response to the online transaction;
   determining device identification information from the received communication, wherein the device identification information identifies the device;
   storing the device identification information in association with the online transaction, and
   monitoring additional transactions for marketing purposes based at least in part on comparing the stored device identification information for the online transaction with information about another online transaction,
   wherein determining device identification information from the received communication comprises:
      obtaining configuration information based on a message sent from the device; and
      determining the device information based on the obtained configuration information, wherein the obtained configuration information comprises information contained in an HTTP header of a message sent from the device.

2. The method of claim 1, wherein determining device identification information from the received communication comprises:
   determining the device information based on inherent information in the communication from the device.

3. The method of claim 1, wherein the device identification information is determined based at least in part on a time of day extracted from a clock on the device.

4. The method of claim 1, wherein the device identification information is determined based at least in part on time characteristics of a clock on the device.

5. The method of claim 1, wherein determining device identification information from the received communication comprises:
   sending a script to the device, wherein the script comprises instructions to cause the device to convert information about the device into a machine fingerprint; and
   receiving the machine fingerprint from the script running on the device.

6. The method of claim 5, wherein the machine fingerprint comprises a hash function of a string comprising the information about the device.

7. The method of claim 1, wherein the device identification information is determined based at least in part on one or more configuration settings of a program being executed on the device.

8. The method of claim 1, wherein determining device identification information from the received communication comprises:
   executing instructions to cause the device to obtain attributes and/or configuration settings of the device; and
   receiving the obtained attributes and/or configuration settings of the device from the executed instructions.

9. A method for identifying a device involved in an online transaction, the method comprising:
   receiving a communication from the device in response to the online transaction;
   determining device identification information from the received communication, wherein the device identification information identifies the device;
   storing the device identification information in association with the online transaction, and
   monitoring additional transactions for possible fraudulent transactions, based at least in part on comparing the stored device identification information for the online transaction with information about another online transaction,
   wherein determining device identification information from the received communication comprises:
      obtaining configuration information based on a message sent from the device; and
      determining the device information based on the obtained configuration information, wherein the obtained configuration information comprises information contained in an HTTP header of a message sent from the device.

10. The method of claim 9, wherein determining device identification information from the received communication comprises:
    determining the device information based on inherent information in the communication from the device.

11. The method of claim 9, wherein the device identification information is determined based at least in part on a time of day extracted from a clock on the device.

12. The method of claim 9, wherein the device identification information is determined based at least in part on time characteristics of a clock on the device.

13. The method of claim 9, wherein determining device identification information from the received communication comprises:
    sending a script to the device, wherein the script comprises instructions to cause the device to convert information about the device into a machine fingerprint; and
    receiving the machine fingerprint from the script running on the device.

14. The method of claim 13, wherein the machine fingerprint comprises a hash function of a string comprising the information about the device.

15. The method of claim 9, wherein the device identification information is determined based at least in part on one or more configuration settings of a program being executed on the device.

16. The method of claim 9, wherein determining device identification information from the received communication comprises:
    executing instructions to cause the device to obtain attributes and/or configuration settings of the device; and
    receiving the obtained attributes and/or configuration settings of the device from the executed instructions.

* * * * *